(12) United States Patent
Klar et al.

(10) Patent No.: US 9,063,214 B2
(45) Date of Patent: Jun. 23, 2015

(54) MONOSTATIC MULTI-BEAM RADAR SENSOR FOR MOTOR VEHICLES

(75) Inventors: Michael Klar, Magstadt (DE); Thomas Binzer, Stuttgart (DE); Dirk Steinbuch, Wimsheim (DE); Dirk Freundt, Kortnal-Muenchingen (DE); Bernhard Lucas, Besigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1193 days.

(21) Appl. No.: 12/673,708

(22) PCT Filed: Jun. 25, 2008

(86) PCT No.: PCT/EP2008/058049
§ 371 (c)(1),
(2), (4) Date: Jan. 10, 2011

(87) PCT Pub. No.: WO2009/021768
PCT Pub. Date: Feb. 19, 2009

(65) Prior Publication Data
US 2011/0095937 A1 Apr. 28, 2011

(30) Foreign Application Priority Data
Aug. 16, 2007 (DE) .......................... 10 2007 038 513

(51) Int. Cl.
*G01S 7/03* (2006.01)
*G01S 13/93* (2006.01)
*G01S 13/00* (2006.01)

(52) U.S. Cl.
CPC ................. *G01S 7/032* (2013.01); *G01S 7/036* (2013.01); *G01S 13/003* (2013.01); *G01S 13/931* (2013.01); *G01S 2013/9332* (2013.01);
(Continued)

(58) Field of Classification Search
CPC ..... G01S 7/032; G01S 13/003; G01S 13/931; G01S 7/036; G01S 2013/9321; G01S 2013/9389; G01S 2013/9332; G01S 2013/9385
USPC .................................................... 342/70, 175
See application file for complete search history.

(56) References Cited

U.S. PATENT DOCUMENTS 5,583,511 A * 12/1996 Hulderman .................. 342/175
5,877,726 A * 3/1999 Kudoh et al. ........... 343/700 MS
5,949,365 A * 9/1999 Wagner .......................... 342/70
(Continued)

FOREIGN PATENT DOCUMENTS

| CN | 1673770 | 9/2005 |
|----|---------|--------|
| EP | 1 804 074 | 7/2003 |

(Continued)

OTHER PUBLICATIONS

International Search Report for PCT/EP2008/058049, dated Oct. 11, 2008.

*Primary Examiner* — Matthew M Barker
(74) *Attorney, Agent, or Firm* — Kenyon & Kenyon LLP

(57) ABSTRACT

A radar sensor for motor vehicles includes a plurality of transmission and receiving antennas, which differ in their azimuthal directivity characteristic and to which a separate mixer is assigned, which mixes a transmitted signal with a received signal, at least one of the mixers being a transfer mixer, and at least one other of the mixers having a lower transfer output, wherein the assignment of the transmission and receiving antennas is asymmetrical with respect to the mixers differing in their transfer output.

16 Claims, 3 Drawing Sheets

(52) U.S. Cl.
CPC   *G01S 2013/9385* (2013.01); *G01S 2013/9321* (2013.01); *G01S 2013/9389* (2013.01)

(56) References Cited

U.S. PATENT DOCUMENTS

| | | | | |
|---|---|---|---|---|
| 6,031,483 | A | * | 2/2000 | Urabe et al. .................... 342/70 |
| 6,043,772 | A | * | 3/2000 | Voigtlaender et al. .......... 342/70 |
| 7,663,533 | B2 | * | 2/2010 | Toennesen et al. ............. 342/70 |
| 7,786,928 | B2 | * | 8/2010 | Hansen et al. ................ 342/175 |
| 2004/0027305 | A1 | | 2/2004 | Pleva |
| 2005/0285776 | A1 | | 12/2005 | Miosga et al. |

FOREIGN PATENT DOCUMENTS

| | | |
|---|---|---|
| EP | 1 345 044 | 9/2003 |
| EP | 1 610 148 | 12/2005 |
| JP | 54-101742 | 12/1952 |
| WO | WO 2007/077062 | 7/2007 |

* cited by examiner

MONOSTATIC MULTI-BEAM RADAR SENSOR FOR MOTOR VEHICLES

FIELD OF THE INVENTION

The present invention relates to a radar sensor for motor vehicles, having a plurality of transmission and receiving antennas which differ in their azimuthal directivity characteristics and to which a separate mixer is assigned, which mixes a transmitted signal with a received signal, at least one of the mixers being a transfer mixer and at least one other mixer having a lower transfer power.

BACKGROUND INFORMATION

Radar sensors are used in motor vehicles in connection with driver assistance systems for the purpose of locating objects in the environment of the vehicle, in particular vehicles driving ahead, and for the purpose of measuring their distances and relative speeds. On the basis of the location data of such a radar sensor, an ACC system (adaptive cruise control), for example, not only is able to automatically regulate the speed of the own vehicle to a specific desired speed, but if a preceding vehicle has been located, also to automatically adapt the own vehicle to the speed of the vehicle driving ahead, so that this vehicle is followed at a suitable safety distance. Another application example for radar sensors in motor vehicles is a predictive safety system (PSS), which detects a looming collision as early as possible and automatically initiates measures by which the collision is averted, if possible, or by which the consequences of the collision are mitigated to the greatest extent possible.

Radar sensors in which one and the same antenna element is used both for transmitting the radar signal and also for receiving the signal reflected at an object are referred to as monostatic radar sensors. An associated mixer mixes a portion of the transmitted signal with the received signal and thereby generates an intermediate frequency signal whose frequency corresponds to the frequency difference between the transmitted and the received signal. Because of the Doppler effect, this frequency difference is a function of the relative speed of the reflecting object. In the case of a radar system in which the frequency of the transmitted signal is modulated continuously, e.g., in an FMCW radar (frequency modulated continuous wave), the frequency difference is also dependent on the propagation time of the signal, so that the use of known evaluation technologies makes it possible to derive from the location signal of an object both its distance and the relative speed.

Moreover, a multi-beam radar sensor having a plurality of transmission and receiving antennas that differ in their azimuthal directivity characteristic allows a determination of the azimuth angle of the located objects. To influence the directivity characteristic, for instance, an optical lens which refracts radar waves may be provided and/or it is possible to utilize diffraction and interference effects of the involved antenna elements. In a radar sensor having an optical lens, for example, the plurality of transmission and receiving antennas is situated along a horizontal line at a slight offset relative to the optical axis of the lens, so that their main radiation directions and, consequently, their main sensitivity directions, differ slightly from each other. By comparing the amplitudes and/or phases of the signals received from the different paths (i.e., from the different transmission and receiving antennas), it is then possible to determine the azimuth angle of the object, i.e., the directional angle under which the object is seen from the direction of the sensor.

In the case of advanced radar systems for motor vehicles, the system must respond not only to moving objects, i.e., in particular to other moving vehicles, but also to stationary objects such as stopped vehicles or other obstacles on the road. While moving vehicles are relatively easy to detect based on their own motion and the corresponding difference between the measured relative speed and the driving speed of the own vehicle, it is much more difficult to evaluate the relevance of the objects to the particular task of the driver assistance system in the case of stationary objects. In an environment rich in structures, e.g., in city driving, it must also be taken into account that a considerable number of stationary objects will generally be located within the viewing range of the radar sensor, which complicates the evaluation of the multitude of signals considerably.

For these reasons it is desirable, if possible, to set up the visual range or the field of view of the radar sensor in such a way that from the outset, if possible, only signals from objects are received that are actually also relevant to the task to be performed by the driver assistance system. In particular, the field of view should therefore be set up in such a way that, if possible, no radar echoes are received from objects located far beyond the traffic lane. On the other hand, a radar sensor (LRR: long range radar) for an automatic cruise control system (ACC), for instance, should have the largest possible range, on the order of magnitude of approximately 200 m or more. Because of the unavoidable divergences of the radar beams, at greater distances it will then be nearly impossible to restrict the field of view to the immediate road lane area.

In the case of a multi-beam radar, e.g., in a radar sensor having four transmission and receiving antennas, it is described in DE 10 2004 030 755 to symmetrically reduce the transmission power of the two outer antennas in comparison with the transmission power of the two inner antennas. In this manner a large range is able to be achieved by the two inner antennas, and a still relatively small field of view for large distances, while the weaker margin radiation ensures a sufficient width of the field of view at shorter distances.

The transmission power of the different beams is able to be set via the configuration of the associated mixers, for instance. Radar sensors of the type examined here typically use transfer mixers in which a portion of the transmitted signal used for the mixing with the received signal is transferred to the line leading to the antenna and therefore is emitted via the antenna. On the other hand, so-called isolation mixers are known where virtually no transfer of the transmitted signal to the antenna line takes place. The antenna to which such a mixer is assigned is therefore only able to receive signals transmitted from other antennas, and these received signals are then mixed with the transmitted signal in the mixer. Any possible graduation between pure transfer mixers and pure isolation mixers is possible in this context. The relative strength of the signal transferred onto the antenna line will be called the "transfer output" here.

SUMMARY

Example embodiments of the present invention provide a radar sensor for motor vehicles, by which a shape of the field of view is able to be achieved that is easily adaptable to the particular application.

In example embodiments of the present invention, the assignment of the transmission and receiving antennas is asymmetrical with respect to the mixers that differ in their transfer output.

As a result, there are at least two transmission and receiving antennas in the radar sensor, which are situated symmetrically relative to one another with respect to the center axis of the sensors, and in which the associated mixers differ in their transfer output. The result is an asymmetrical field of view.

Example embodiments of the present invention therefore make it possible to produce in a simple manner radar sensors having an asymmetrical field of view, in particular using the same components from which conventional radar sensors having a symmetrical field of view are made up as well, so that the field of view is optimally adaptable to the particular task of the individual sensor.

A particular use for example embodiments of the present invention includes fitting a motor vehicle with two radar sensors, which are situated on the left and right side of the vehicle and have asymmetrical fields of view, e.g., mutually mirror-inverted fields of view. Superpositioning two fields of view provides an overall broader field of view without losses in range. This considerably reduces the dead angle in the near range.

Moreover, it is especially advantageous that the overlap of the fields of view of the two radar sensors results in high redundancy in the range especially relevant for the cruise control, for example in the region of the azimuth angle of zero and at large and medium distances, which facilitates so-called tracking of the objects from measuring cycle to measuring cycle. Furthermore, by comparing the azimuth angles obtained from the different radar sensors for the same object, the precise location of the object is able to be determined more accurately.

Example embodiments of the present invention may be used for sensors having any number of transmission and receiving antennas. In the same manner, any possible combination of intermediate forms between pure transfer mixers and pure isolation mixers are possible for the mixers.

Exemplary embodiments of the present invention are depicted in the drawing and described in greater detail in the description below.

DETAILED DESCRIPTION

Figure 1:
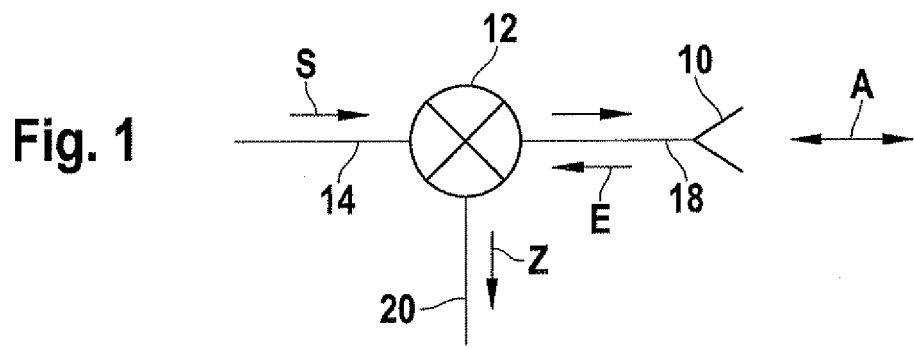
FIG. 1 is a block diagram of an ideal transfer mixer.

FIG. 1 shows a simplified circuit diagram of an antenna 10 and an associated mixer 12 of a radar sensor. Via a supply line 14, mixer 12 receives a transmitted signal S from an oscillator 16 shown in FIG. 3, e.g., a signal having a frequency on the order of 76 GHz, for example. Via an antenna line 18, which connects mixer 12 to antenna 10, the mixer receives a signal E received by antenna 10, and by mixing these two signals the mixer generates an intermediate frequency signal Z, which is output via an output line 20 to an evaluation circuit (not shown).

In practice, mixer 12 is an integrated component (MMIC: monolithic microwave integrated circuit), which is configured as transfer mixer in this instance. This means that a portion of the output of transmitted signal S is transferred to antenna line 18 and then emitted via antenna 10, so that antenna 10 is operating as transmission and receiving antenna. The corresponding signal flows are symbolized by arrows in FIG. 1. It can be seen that two signal flows, in opposite directions, occur on antenna line 18. Accordingly, a double arrow A symbolizes that antenna 10 transmits as well as receives radar radiation.

Figure 2:
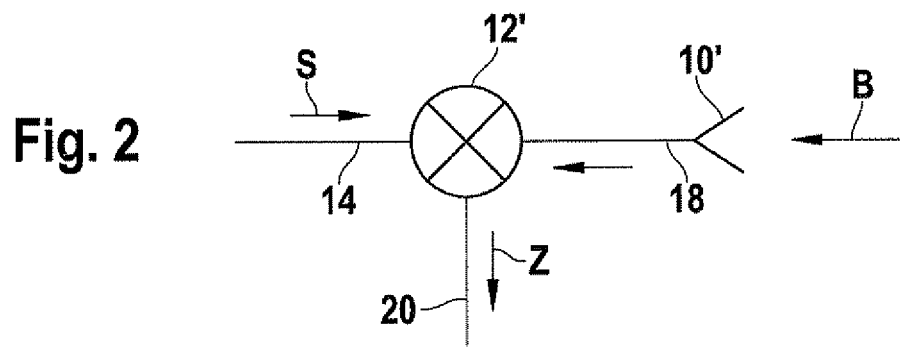
FIG. 2 is a block diagram of an ideal isolation mixer.

FIG. 2 shows a corresponding circuit diagram for an antenna 10' and an associated mixer 12'. The difference from the circuit diagram from FIG. 1 consists only of the fact that mixer 12' is configured as isolation mixer. This means that no output is transferred from supply line 14 to antenna line 18 (in the ideal case). Antenna 10' thus operates as pure receiving antenna in this idealized case, which is symbolized by a single arrow B. As a consequence, there is also only one signal flow, in one direction, on antenna line 18, i.e., in the direction toward mixer 12'.

In practice, it is also possible for mixer 12' according to FIG. 2 to transfer a small portion of the output of transmitted signal S to antenna line 18, so that antenna 10' also transmits a weak signal. In general, MMICs are able to be configured such that any intermediate form between a pure transfer mixer and a pure isolation mixer is realized, i.e., the transfer output, that is to say, the portion of the output that is transferred onto antenna line 18, is able to be adjusted according to the requirements.

Figure 3:
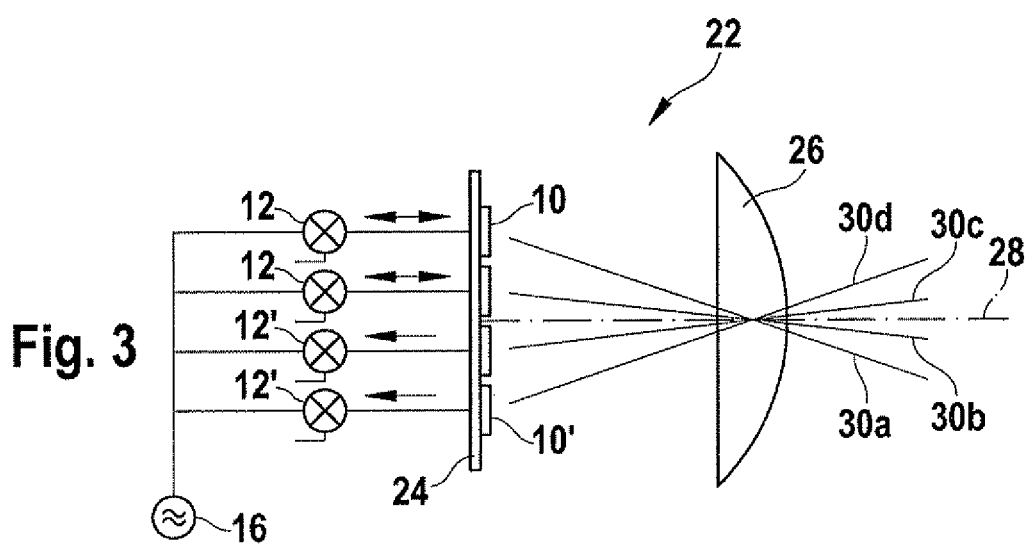
FIG. 3 is a block diagram of a radar sensor according to an example embodiment of the present invention.

FIG. 3 shows a block diagram of a radar sensor 22 according to an example embodiment of the present invention. A total of four antennas 10, 10' is situated on a mounting plate 24 such that they lie at regular intervals on a line that is horizontal in the installation position. Situated at a distance from antennas 10 is a shared lens 26 such that the antennas lie approximately in the focal plane of the lens. Lens 26 defines an optical axis 28 of the radar sensor. Since antennas 10 are offset at different distances with respect to optical axis 28, lens 26 bundles their radiation into four beams 30a-30b, which are irradiated at slightly different azimuth angles.

A separate mixer 12, which operates as transfer mixer, is assigned to the two upper antennas 10 in FIG. 3, which generate right beams 30a and 30b in the emission direction. In contrast, a separate mixer 12', which has a considerably lower transfer output and therefore is referred to as isolation mixer in abbreviated form here, is assigned to the two other antennas 10'. Double arrows or arrows in FIG. 3 symbolize that antennas 10 are operating as transmission and receiving antennas, while antennas 10' operate predominantly as receiving antennas and in so doing, receive the echo of signals transmitted by the two other antennas 10.

The special feature of radar sensor 22 described here consists of the fact that the placement of antennas 10 and 10', which differ in the transfer output of associated mixers 12, 12', is asymmetrical relative to optical axis 28 of the sensor. In the illustrated example two antennas 10 having a strong transmission power lie on one side of the optical axis, while two antennas 10' having a weak transmission power or no transmission power at all are situated on the other side of the optical axis.

Figure 4:
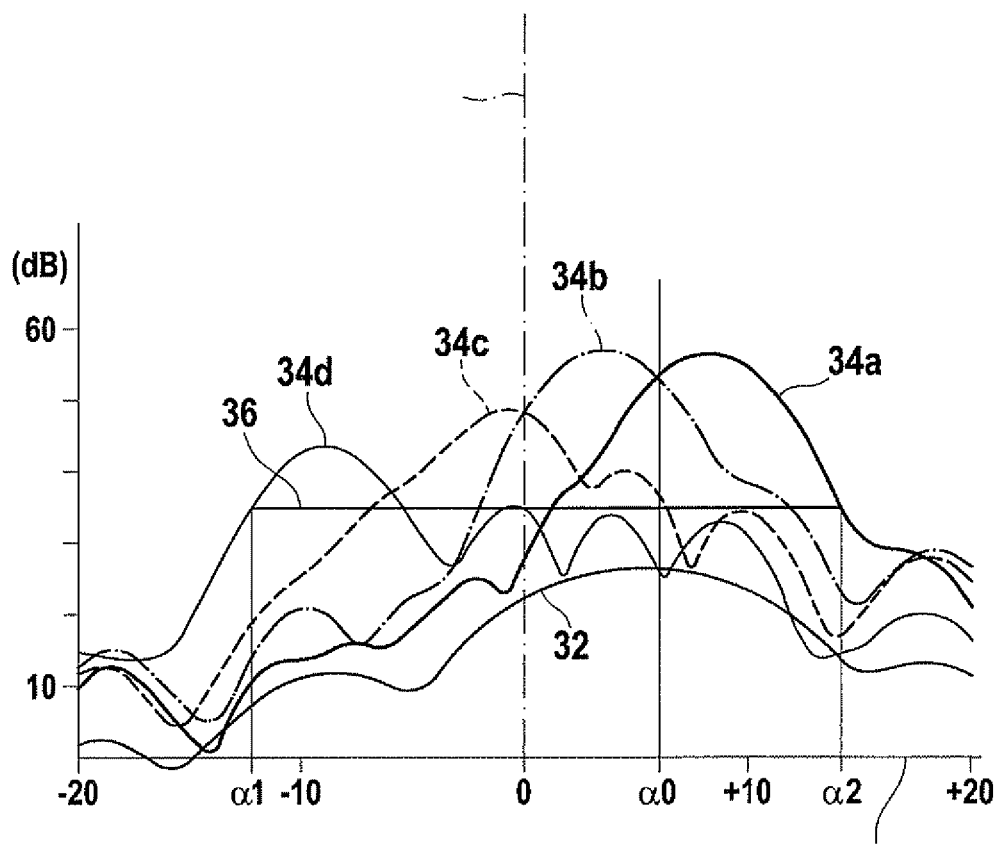
FIG. 4 is an antenna diagram of the radar sensor according to FIG. 3.

The associated antenna diagram is illustrated in FIG. 4. Curve 32 in FIG. 4 indicates the transmission gain of radar sensor 22 as a whole as a function of the azimuth angle. Since the transmitted radar radiation stems only from the two antennas 10, which have an offset to the same side relative to optical axis 28, curve 32 has its maximum not at the azimuth angle of 0°, but at a particular azimuth angle $\alpha 0$, which amounts to approximately +6° in the example illustrated. With regard to main radiation angle $\alpha 0$, the transmission gain indicated by curve 32 is substantially symmetrical, inasmuch as practically only the two antennas 10 whose mixers 12 have an identical configuration and transfer signals of approximately equal strength to the antennas contribute to this gain.

Curves 34a-34d in FIG. 4 indicate the two-way gain (transmission and receiving gain) for each individual beam 30a-30d. Curves 34a and 34b, which are associated with the transmitting antennas 10, have the highest main maxima, and these maxima lie symmetrically with respect to main radiation angle α0. The reason for this is that these antennas have their greatest sensitivity in the direction in which their transmission gain is greatest as well.

On the other hand, curves 34c and 34d, which are associated with non-transmitting antennas 10', have weaker main maxima, which in addition are asymmetrical with respect to main radiation angle α0. Furthermore, in curve 34d the main maximum is smaller than in curve 34c, because the antenna associated with curve 34d has its greatest sensitivity for a direction into which only relatively little output is radiated by the two transmitting antennas 10.

To make it possible for an object situated at a specified distance from radar sensor 22 to be located by the radar sensor in the first place, the two-way gain of at least one of the four antennas must lie above a specific detection threshold. One example of such a detection threshold is shown in FIG. 4 in the form of a horizontal line 36. The points of intersection of this detection threshold and curves 34a and 34d, which are associated with the two edge beams 30a and 30d of the radar sensor, define interval limits α1, α2 of a viewing range that radar sensor 22 has for this specified distance. It can be seen that this viewing range is asymmetrical not only with respect to azimuth angle 0°, but with respect to main radiation angle α0 as well. Left limit al of the viewing range has an angular distance of approximately 18° from α0, while right limit α2 has a distance of only approximately 8° from α0.

Figure 5:
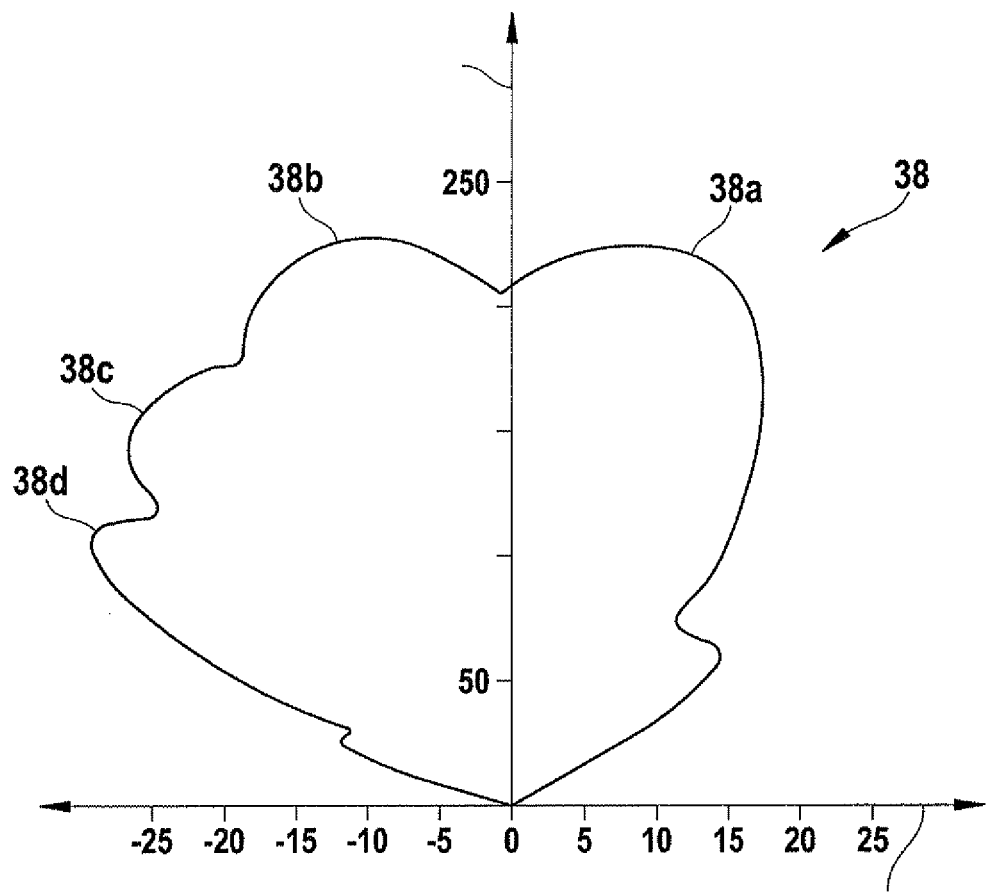
FIG. 5 is a diagram (not true to scale) of the field of view of the radar sensor according to FIG. 3.

If a viewing threshold that corresponds to viewing threshold 36 is determined for each conceivable object distance and the associated limits of the viewing range, then the overall result is a field of view 38 as it is illustrated for the sensor described here in FIG. 5. Here, field of view 38 is shown in a coordinate system whose X-axis, denoted by "distance", extends parallel to the longitudinal vehicle axis, while the Y-axis, denoted by "lateral offset", corresponds to the transverse axis of the vehicle. In this example it is assumed that radar sensor 22 is installed in the vehicle such that the longitudinal vehicle axis (Y-axis) does not correspond to the azimuth angle 0° but instead corresponds to main radiation angle α0. In other words, the angular deviation of the main radiation direction caused by the offset of the two transmitting antennas 10 is largely compensated by the corresponding installation of the radar sensor.

Not compensated, however, is the asymmetry resulting from the different assignments of the antennas to mixers 12 and 12', which leads to the asymmetrical appearance of curves 34a-34d in FIG. 4. This asymmetry can also be seen in the field of view in FIG. 5. In particular, it is noticeable that the field of view on the right side extends only up to lateral offsets of approximately 15 m, while on the left side, it extends up to lateral offsets of approximately 25 m. On the left side, the field of view has two "protuberances" 38c, 38d, which correspond to the main maxima of curves 34c and 34d in FIG. 4 and are missing on the right side. In the vicinity of the main radiation direction, field of view 38 has two main lobes 38a, 38b, which correspond to the main maxima of curves 34a, 34b in FIG. 4.

Figure 6:
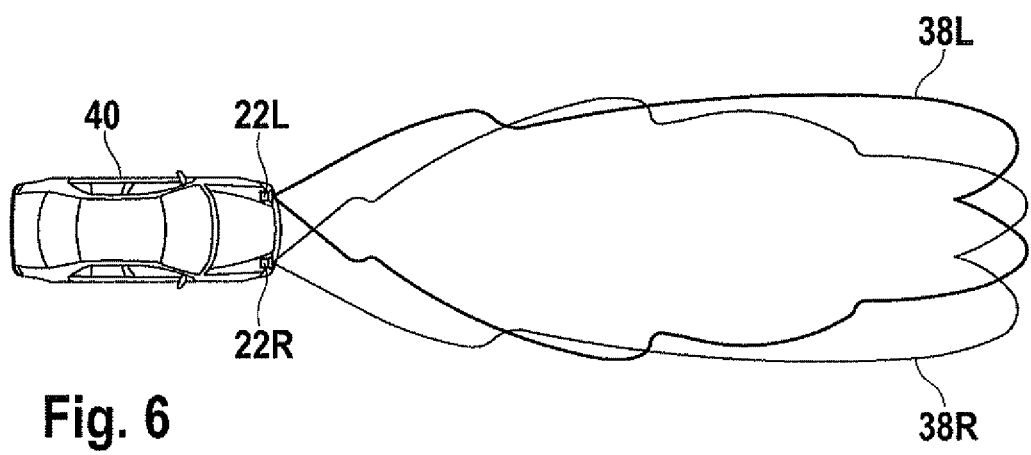
FIG. 6 is a schematic layout of a motor vehicle having two radar sensors according to an example embodiment of the present invention and associated fields of view.

FIG. 6 schematically shows the layout of a motor vehicle 40, in which two radar sensors 22L and 22R are installed in the region of the front bumper, one each on the left and right side of the vehicle. These two radar sensors 22L and 22R basically have the same design as radar sensor 22 shown in FIG. 3, but they are configured as mirror-images of each other, with the result that their fields of view 38L, 38R are mirror-inverted relative to each other as well. Moreover, the two fields of view 38L and 38R are laterally offset from one another according to the offset of radar sensors 22L and 22R. Seen by itself, each individual field of view 38L and 38R has the same asymmetry as field of view 38 in FIG. 5. However, an overall symmetrical field of view for the locating system made up of two sensors is achieved overall nevertheless because of the mirror-inverted placement of the sensors.

The superpositioning of two asymmetrical and substantially mutually mirror-inverted fields of view yields a number of advantages.

For one, in this manner it is possible to ensure that the overall field of view has a relatively constant width across a relatively large distance range. This allows sufficient field depth to be achieved, without more and more irrelevant objects from beyond the road appearing in the visual field with increasing distance; on the other hand, virtually continuous monitoring of the area in front is made possible at short distances, without any significant occurrences of dead angles.

Using at least two antennas, an object is able to be located in a relatively large core region of each field of view 38L and 38R, so that the azimuth angle of the object is able to be determined by evaluating the amplitudes and phases. Moreover, in the range where fields of view 38L and 38R overlap, the measured distances and relative speeds and also the azimuth angles (the latter by taking the offset between radar sensors 22L and 22R into account) can be adjusted to each other, so that higher measuring precision and reliability are obtained. For control purposes, the measured azimuth angles of the objects may additionally also be calculated by triangulation.

In this manner a possible maladjustment of one of the two radar sensors 22L, 22R is able to be detected as well and compensated arithmetically.

The exemplary embodiment described may be modified in a multitude of manners. For example, radar sensors utilizing different numbers of beams, e.g., three or six beams, may be used. In the case of a radar sensor having four beams, for example, it is also possible to combine three transfer mixers and one isolation mixer with each other. Accordingly, different combinations of mixer types are also possible for sensors having a different number of beams. Furthermore, three or more different types of mixers may be provided such as one pure transfer mixer, one pure isolation mixer, and one mixer having an average transfer output, and to then assign these mixers asymmetrically to the various antennas.

What is claimed is:

1. A motor vehicle, comprising:
a radar sensor for a motor vehicle, including:
an even number, greater than zero, of antennas; and
for each of the antennas, a respective mixer that is connected to the respective antenna and that is configured to mix a first signal with a received signal;
wherein:
the antennas differ from each other in their respective azimuthal directivity characteristic;
half of the antennas are arranged at a first side of an optical axis;
half of the antennas are arranged at an opposite second side of the optical axis;
the mixers connected to the antennas arranged at the first side of the optical axis are all configured for greater signal transmission to their respectively connected antennas than signal transmission of each of the mixers connected to the antennas arranged at the second side of the optical axis to their respectively connected antennas, such that the radar sensor is configured for transmission output of the radar sensor to be asymmetrical relative to the optical axis; and the mixers connected to the antennas arranged at the second side are configured for providing a signal, to their respectively connected antennas for output, at a lesser transmission strength than the mixers connected to the antennas arranged at the first side.

2. The motor vehicle according to claim 1, wherein the motor vehicle includes at least two radar sensors.

3. The motor vehicle according to claim 2, wherein the radar sensors are situated at an offset from each other in a transverse direction of the motor vehicle, and are configured such that their asymmetrical fields of view are substantially mirror-inverted relative to each other.

4. The motor vehicle according to claim 3, wherein the asymmetrical fields of view at least partly overlap.

5. The motor vehicle according to claim 3, wherein all of the antennas are arranged at different horizontal offsets from a longitudinal axis of the vehicle.

6. A radar sensor for a motor vehicle, comprising:
an even number, greater than zero, of antennas; and
for each of the antennas, a respective mixer that is connected to the respective antenna and that is configured to mix a first signal with a received signal;
wherein:
the antennas differ from each other in their respective azimuthal directivity characteristic;
half of the antennas are arranged at a first side of an optical axis;
half of the antennas are arranged at an opposite second side of the optical axis;
the mixers connected to the antennas arranged at the first side of the optical axis are all configured for greater signal transmission to their respectively connected antennas than signal transmission of each of the mixers connected to the antennas arranged at the second side of the optical axis to their respectively connected antennas, such that the radar sensor is configured for transmission output of the radar sensor to be asymmetrical relative to the optical axis;
the radar sensor is configured for the first signal to be output as the asymmetrical transmission output; and
the mixers connected to the antennas arranged at the second side are configured for providing the first signal, to their respectively connected antennas for output, at a lesser transmission strength than a strength at which the mixers connected to the antennas arranged at the first side are configured to provide the first signal to their respectively connected antennas for output.

7. The radar sensor according to claim 6, wherein the radar sensor is configured to determine a location of an object based on a combination of respective echoes, of a signal transmitted by the half of the antennas arranged at the first side of the optical axis, received at each of the antennas arranged at both the first and second sides of the optical axis.

8. The radar sensor according to claim 6, wherein the optical axis is of a lens through which the antennas transmit and receive.

9. A radar sensor for a motor vehicle, comprising:
an even number, greater than zero, of antennas; and
for each of the antennas, a respective mixer that is connected to the respective antenna and that is configured to mix a first signal with a received signal;
wherein:
the antennas differ from each other in their respective azimuthal directivity characteristic;
half of the antennas are arranged at a first side of an optical axis;
half of the antennas are arranged at an opposite second side of the optical axis;
the mixers connected to the antennas arranged at the first side of the optical axis are all configured for greater signal transmission to their respectively connected antennas than signal transmission of each of the mixers connected to the antennas arranged at the second side of the optical axis to their respectively connected antennas, such that the radar sensor is configured for transmission output of the radar sensor to be asymmetrical relative to the optical axis; and
the mixers connected to the antennas arranged at the second side are configured for providing a signal, to their respectively connected antennas for output, at a lesser transmission strength than the mixers connected to the antennas arranged at the first side.

10. The radar sensor according to claim 9, wherein the radar sensor is configured to determine a location of an object based on a combination of respective echoes, of a signal transmitted by the half of the antennas arranged at the first side of the optical axis, received at each of the antennas arranged at both the first and second sides of the optical axis.

11. The radar sensor according to claim 9, wherein the radar sensor is configured to determine a location of an object based on a combination of respective echoes, of a signal transmitted by the half of the antennas arranged at the first side of the optical axis, received at each of the antennas arranged at both the first and second sides of the optical axis.

12. The radar sensor according to claim 9, wherein the same first signal is mixed by all of the mixers.

13. The radar sensor according to claim 9, wherein the radar sensor is configured for the first signal to be output as the asymmetrical transmission output.

14. The radar sensor according to claim 13, wherein the radar sensor is configured to determine a location of an object based on a combination of respective echoes, of a signal transmitted by the half of the antennas arranged at the first side of the optical axis, received at each of the antennas arranged at both the first and second sides of the optical axis.

15. The radar sensor according to claim 9, wherein the optical axis is of a lens through which the antennas transmit and receive.

16. The radar sensor according to claim 9, wherein the radar sensor is configured to determine a location of an object based on a combination of respective echoes, of a signal transmitted by the half of the antennas arranged at the first side of the optical axis, received at each of the antennas arranged at both the first and second sides of the optical axis.

* * * * *